United States Patent

[11] 3,575,432

[72] Inventor Dudley D. Taylor
  Beltsville, Md.
[21] Appl. No. 864,758
[22] Filed Oct. 8, 1969
[45] Patented Apr. 20, 1971
[73] Assignee Pressure Science, Inc.
  Beltsville, Md.

[54] SEALING RING
  13 Claims, 8 Drawing Figs.
[52] U.S. Cl. .................................................. 277/206R
[51] Int. Cl. ........................................... F16j 15/16,
  F16j 15/04
[50] Field of Search ........................................ 285/100-
  —103; 277/205, 206, 235 (A)

[56] References Cited
  UNITED STATES PATENTS
  3,192,690 7/1965 Taylor ......................... 277/205X
  3,240,501 3/1966 Smith .......................... 277/206X
  FOREIGN PATENTS
  712,786 7/1954 Great Britain ................ 277/235(A)

Primary Examiner—Laverne D. Geiger
Assistant Examiner—Robert I. Smith
Attorney—Roylane, Abrams, Berdo & Kaul ABSTRACT: There is disclosed a metal sealing ring being of approximate E-shape in radial cross section. The outer arms of the E have a sinuous configuration. The outer arms of the E are of essentially equal length and are from 1.5 to 3.5 times as long at the middle arm of the E. There is also disclosed the sealing ring in combination with a flange and a clamp.

Patented April 20, 1971

INVENTOR.
DUDLEY D. TAYLOR
BY
Arnold, Roylance, Kruger & Durkee
ATTORNEYS

Patented April 20, 1971
3,575,432
2 Sheets-Sheet 2
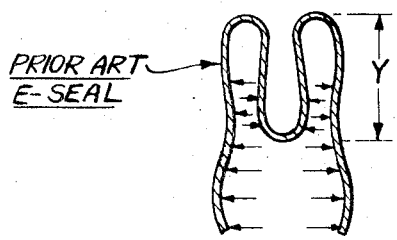
Fig.6.
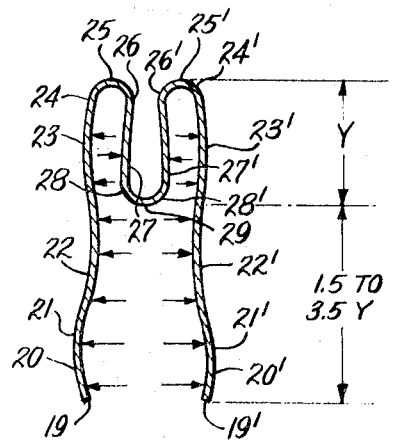
Fig.7.
Fig.8.
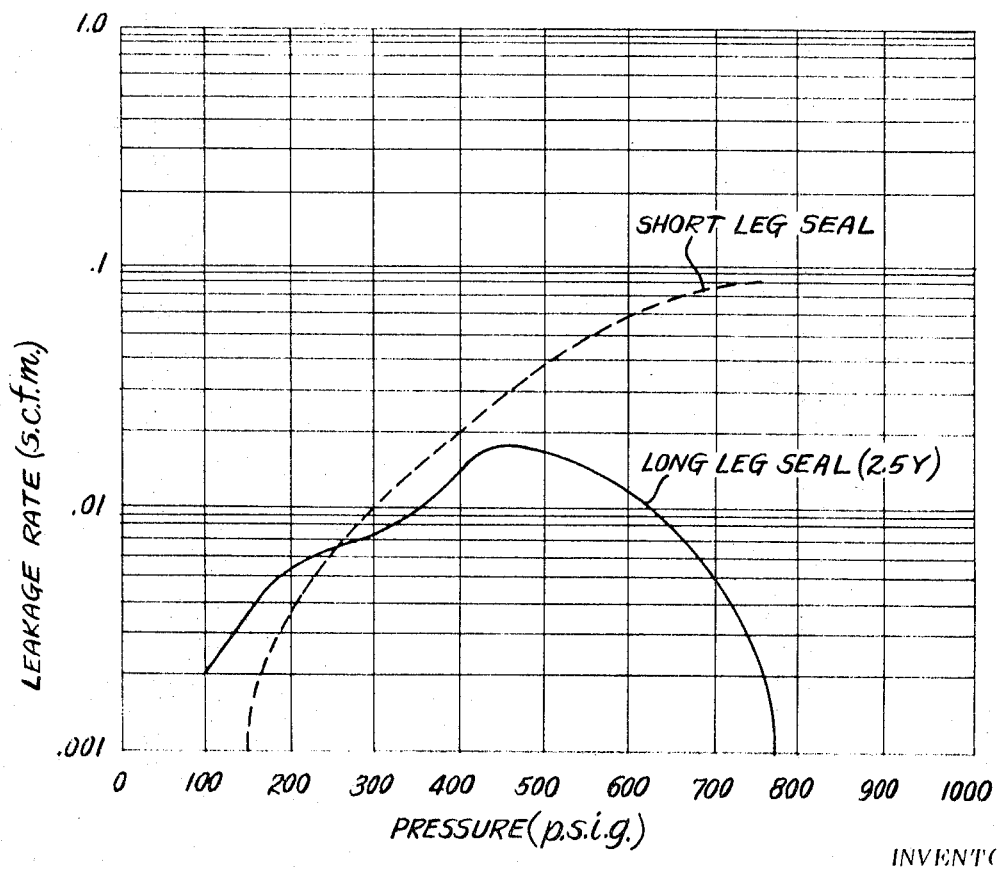
INVENTOR.
DUDLEY D. TAYLOR
BY
Arnold, Roylance, Kruger & Durkee
ATTORNEYS

SEALING RING

IMPROVED SEALING RING

This invention relates to metal sealing rings and more particularly to sealing rings which are especially adapted for confining fluids at high temperatures and pressures and wherein the sealing effect is produced by the wedging action of the rings in opposed grooves or cavities formed in suitable connections or flanges.

As known in the art, there are many applications, such as in the pneumatic piping systems in aircraft, missiles and the like, wherein it is particularly desirable or essential to make pipe connections or fittings with light weight components. Sealing rings designed for such systems, i.e., those wherein the weight of the components to be sealed is minimized, must be sufficiently flexible to follow the large deflections in the sealing surfaces and to maintain contact between the seal and the sealing surfaces without relative movement of the parts at the lines or areas of contact. The amount of deflection of the sealing surfaces, of course, increases significantly at high temperatures and pressures.

A sealing ring particularly adapted for use in systems such as described above is disclosed in my U.S. Pat. No. 3,192,690 which issued on July 6, 1965. In this patent there is disclosed a sealing ring of approximate E-shape in radial section, the upper and lower arms of said E being smoothly sinuous and the back of the E being broken by a central loop or convolution which forms the short horizontal central arm or member of the E. The sealing ring of this patent has proved to have utility such as for airplane hydraulic systems subject to repeated changes in pressure.

In summary, the sealing ring of the present invention is an improvement over that disclosed in U.S. Pat. No. 3,192,690 and is especially adapted for use in pneumatic piping systems on aircraft and missiles wherein very high temperatures and pressures are encountered. In its broadest aspect, the present invention is based on the discovery that the deflection capability of the seal can be greatly increased by increasing the length of sealing "arms" (i.e., the outer arms of the E) with respect to the central convolution or arm. In this manner the pressure which causes the large flange deflections also causes the seal to follow the flange and maintain a tight seal, i.e., the seal is "energized" by the high pressure in the system.

It is accordingly a general object of this invention to provide an improved sealing ring especially adapted for confining fluids at high temperatures and pressures.

Another and more particular object is to provide a seal suitable for use at temperatures up to 2,000° F. and to hold pressures up to 10,000 p.s.i. and is especially adapted for use in pneumatic piping systems on aircraft, missiles and the like.

Yet another object is to provide a seal which is especially adapted for confining gases at high pressures, said seal being energized by the gases at said high pressures thereby substantially reducing the leakage rate of gases as compared to the prior known sealing members or rings.

The manner in which the foregoing objects are achieved in accordance with the present invention will be better understood in view of the following detailed description and accompanying drawings which form a part of the specification and wherein:

FIG. 6 is a partial radial sectional view showing a known prior art sealing ring;

FIG. 7 is a view corresponding to FIG. 6 but showing the details of the sealing ring of this invention;

FIG. 8 is a leakage curve showing a plot of leakage rate versus pressure for the short leg sealing ring of FIG. 6 and for the long leg sealing ring of FIG. 7, according to this invention.

Figure 1:
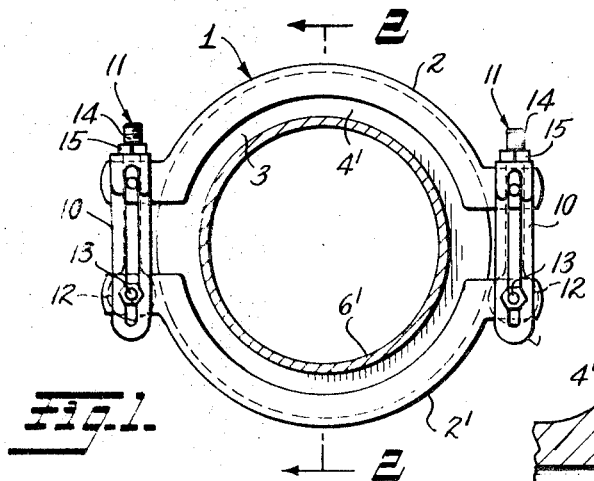
FIG. 1 is a sectional view taken through tubing and showing a coupling with which the sealing ring of this invention has particular utility.
Figure 2:
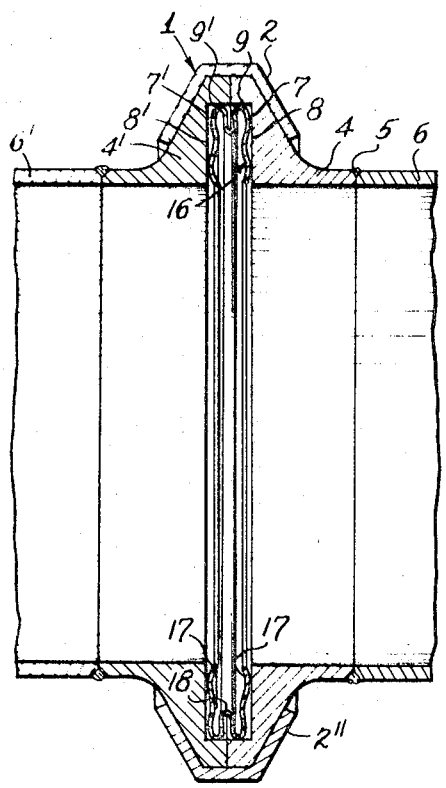
FIG. 2 is an enlarged view in section taken along line 2-2 of FIG. 1 and showing a first embodiment of the sealing ring of this invention.

Referring now to the drawings in detail and first to FIGS. 1 and 2, there is shown a fluid line coupling and clamping device indicated generally at 1 which may be used in combination with the sealing ring of the present invention. The coupling assembly shown in FIGS. 1 and 2 is commonly referred to as V-band clamp which, as known in the art, is used for coupling flanged members such as tube sections in a fluid line. With reference to FIGS. 1 and 2, the coupling assembly includes a pair of semicircular constrictor bands 2 and 2' which are in embracing relation to a tube flange assembly, indicated generally at 3, the latter including mating flanges 4 and 4'. The flanges 4 and 4' are secured, as by welding at 5, to tube section 6 and 6'. Opposed annular coaxial grooves or cavities, indicated at 7 and 7', are formed in the annular faces of the flanges 4 and 4'. A first embodiment of the sealing ring of the invention, indicated generally at 16, is interposed between and engaged by the flanges 4 and 4', i.e., in contact with the opposed faces 8, 9 and 8', 9' of the cavities or grooves 7 and 7' respectively.

The semicircular constrictor bands 2 and 2' embrace the mating flanges 4 and 4' and are adapted, when constricted by takeup connector units 10, to apply axial pressure to the flanges for moving them toward each other. The constrictor bands 2 and 2' are V-shaped in radial section and include radially inwardly diverging sidewall portions 2" which function as jaws for the wedging action against the flanges. The takeup connector units may be, as is well known in the art, of any suitable design. In the embodiment shown in FIG. 1, the takeup units include an eye bolt 11 (like numerals are used for each unit) having an apertured head 12 (pivotally mounted on the bolt 13) and a threaded end 14. The constrictor bands are drawn toward each other when the nut 15 on end 14 is advanced on the bolt.

Turning now to the details of the improved sealing device of the present invention, and with reference to FIGS. 2 and 7, there is shown at 16 a sealing ring in the form of an integral piece of metal, such as Inconel X, and of approximate E-shape in radial cross section. The outer arms 17 of the E are smoothly sinuous as shown and the back of the E is broken by a central loop or convolution which forms the central arm 18 of the E. Beginning at the margin 19 of the radial section shown in FIG. 7, the metal curves outwardly to form an outwardly convex portion 20 which contains point 21 (which represents the first sealing line), next there is a depression 22, followed by a turn forming about three quarters of a full circle and including consecutively in order, an outwardly convex portion 23 representing the second sealing line, convex portion 24 which contains point 25, which represents the first mechanical support line, and portion 26 forming the mouth of the loop or convolution 27. The end 28 of convolution contains the point 29 representing the neutral axis. The other or opposed half of the radial section is exactly the same reversed so that the same numerals are applied using a prime in each case. It should be noted from FIGS. 2 and 7 that the seal is symmetrical with respect to a plane passing vertically through the neutral axis and that the seal is formed from a circular piece of metal of uniform thickness and axial length. In general, the sealing ring of the present invention may vary in size from less than a fourth of an inch to as much as a 50 inch diameter and with varying overall depths or heights with three thirty-seconds of an inch as a medium size. Preferably the sealing ring is metal, such as 304 stainless steel or Inconel X. It can be manufactured at low cost, i.e., from a blank using well-known metal-forming techniques, etc., and can be coated with various low yield strength materials such as Teflon, rubber, silver, gold, lead, indium or combinations thereof. Such coatings assure adequate sealing on rough surface finishes.

As generally set forth hereinabove, when the sealing surface deflects large amounts (note FIG. 3), it is essential that contact between the seal and sealing surfaces be maintained without relative movement of the parts at the points or areas of contact. In this regard it should be noted that such movement is eliminated or at least minimized by the central convolution 18 which tends to straighten out when the pressure is applied, thus developing a compressive stress in the seal located at the lines of support, thereby providing additional sealing force. Further, the depression 22 serves an important function since when pressure is applied to the inner or convex side of the depression, forces are generated at the points of contact of the convex portions 21 and 23. Since point 25 tends to curl inwardly, which is directly opposite what the pressure is trying to do between points 25 and 23, a cancelling of the bending moments is obtained at 25.

Figure 3:
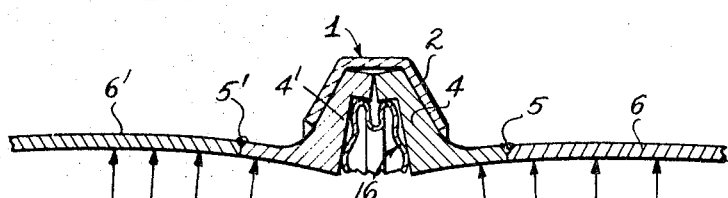
FIG. 3 is a partial view in section corresponding to FIG. 2 and showing the deformation of the tube, coupling, and seal ring of the embodiment of FIG. 2.

While the above discussed advantages of the E-shaped sealing ring of this invention are also inherent in the sealing ring disclosed in U.S. Pat. No. 3,192,690 (the latter being illustrated in the partial radial sectional view of FIG. 6), the present invention is based on the discovery that to obtain minimum leakage in high-pressure pneumatic systems, the ratio of the length of the outer arms relative to the length of the central arm or convolution is critical. Thus it has been discovered that if the outer arms are from 1.5 to 3.5 times as long as the central arm, the leakage rate is substantially reduced and, in fact, at very high pressures is eliminated in the sense that same cannot be detected. In effect, by increasing the length of the outer sealing arms with respect to the central arm, the pressures which cause the large flange deflections, as illustrated in FIG. 3, also energize the seal such that it follows the flange and maintains a tight seal. In this regard, FIG. 8 is a leakage curve showing a plot of leakage rate versus pressure for the standard short leg sealing ring, as disclosed in U.S. Pat. No. 3,192,690 and illustrated in FIG. 6, and the long leg sealing ring of the present invention, shown in FIGS. 2 and 7. Six-inch-diameter seals were used for the tests. The tests were conducted at room temperature employing the two-bolt V-clamp coupling assembly shown in FIG. 1. The two-bolt coupling was tightened to 120 lb. inches. Consecutive tests using air as the gaseous medium were conducted at room temperature for each seal without disturbing the joint. The ratio of the outer arms to the central arm for the long leg seal of FIG. 8 was 2.5.

As strikingly illustrated in the chart, at a pressure of approximately 150 p.s.i.g., the leakage rate for the short leg seal increases and levels off to an approximate leakage rate of 0.1 s.c.f.m. at about 770 p.s.i.g. and above. Unexpectedly, however, the leakage rate curve for the long leg seal of this invention reaches a maximum leakage rate loss of about 0.018 s.c.f.m., which is well below that of the short leg seal, i.e., 0.1 s.c.f.m., at a pressure of approximately 450 p.s.i.g. At this point the leakage decreases significantly and at a pressure of about 780 p.s.i.g., and above, is substantial zero.

It has also been discovered that if the long leg seal is coated with low yield strength material, i.e., gold, silver, etc. as described above, improved sealing curves are obtained by continued cycling. This is believed to be a result of the coating becoming embedded in the inner surfaces of the flanges. Also, if the temperature of the system is increased to above the softening or annealing point of the coating, improved results are obtained inasmuch as the coating becomes embedded in any surface defects of the mating flange surfaces.

Figure 4:
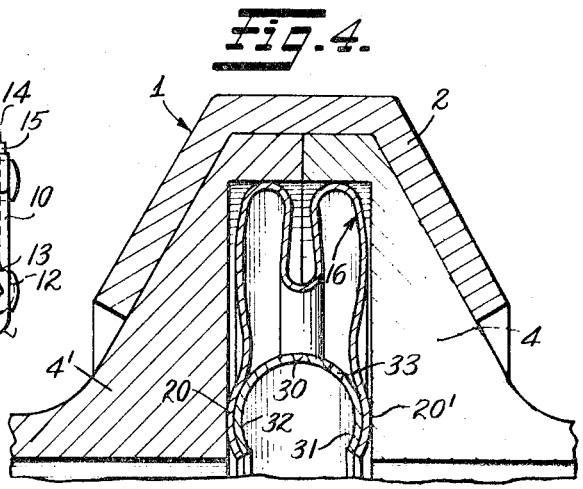
FIG. 4 is an enlarged partial view in section corresponding to FIG. 2 and showing a second embodiment of the sealing ring of this invention.

Turning now to FIG. 4, there is shown a second particular advantageous embodiment of the instant invention. In this embodiment, there is provided means, as described in detail hereinbelow, to enhance the sealing effect of the first convex portion 20 and 20' at the initial installation or at low pressures, i.e., provide high load between the seal and the flange at low pressures. In the embodiment of FIG. 4, the load-increasing means includes an integral one-piece ring 30 of approximate C-shape in radial section. As shown, the C-ring 30 is disposed within and engages the inwardly concave surfaces indicated generally at 31 and 32 of the outer arms of the E-shaped sealing ring. The open portion of the C-ring faces generally inwardly and vent means 33 is provided so that the gases within the fluid line system are in communication with the region inwardly of the C-ring.

Figure 5:
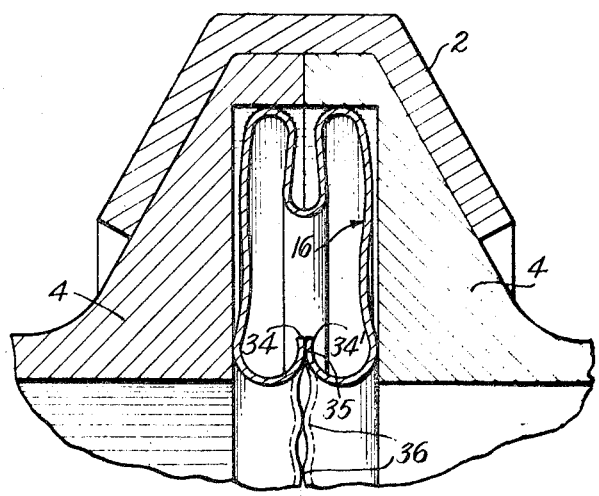
FIG. 5 is a view corresponding to FIG. 4 and showing a third embodiment of the sealing ring of this invention.

In FIG. 5, there is shown a third particularly advantageous embodiment of the invention. In this embodiment and to effect the result of that of the C-ring in FIG. 4, i.e., high load between the seal and the flange at low pressures, the tip portions 34 and 34' of the outer arms of the E are curved over with the outer surfaces thereof being in mutually opposed engaging relationship as indicated at 35. The lip portions 36 are preferably made with wavy or sinuous surfaces to ensure that the high pressure fluid or gases within the fluid line system are in communication with the inside of the E-seal to cause it to follow the flange deflections under pressure, as generally described above.

While particularly advantageous embodiments of the invention have been described and illustrated, it will be recognized by those skilled in the art that various modifications can be made therein without departing from the scope of the claims.

I claim:

1. A seal especially adapted for confining fluids at high temperatures and pressures, and comprising a sealing ring in the form of an integral piece of resilient sheet metal of approximately E-shape in radial cross section, the outer arms of the E having a sinuous configuration and including continuous raised portions at the outer and inner ends thereof which are outwardly convex and a continuous portion intermediate said raised portions which is outwardly concave, the central arm of the E having two elongated portions which extend in generally parallel, spaced, side-by-side relation and are interconnected at the inner end of said central arm by a 180° bend, said outer arms of the E being of essentially equal length and the portions of said outer arms which project inwardly beyond said inner end of the central arm being from 1.5 to 3.5 times as long as said central arm, said outer arms of the E diverging from the periphery of the ring outwardly when the ring is in its normal relaxed condition.

2. The combination as defined in claim 1 wherein the metal sealing ring is coated with a material selected from the group consisting of gold, silver, lead or indium and mixtures thereof.

3. A seal especially adapted for confining fluids at high temperatures and pressures, and comprising a sealing ring in the form of an integral piece of resilient sheet metal of approximately E-shape in radial cross section, the outer arms of the E having a sinuous configuration and including continuous raised portions at the outer and inner ends thereof which are outwardly convex and a continuous portion intermediate said raised portions which is outwardly concave, the central arm of the E having two elongated portions which extend in generally parallel, spaced, side-by-side relation and are interconnected at the inner end of said central arm by a 180° bend, said outer arms of the E being of essentially equal length and the portions of said outer arms which project inwardly beyond said inner end of the central arm being from 1.5 to 3.5 times as long as said central arm, said outer arms of the E diverging from the periphery of the ring outwardly when the ring is in its normal relaxed condition, said continuous outwardly concave portion intermediate of said raised portions lying radially inwardly of a line perpendicular to the inner end of said central arm defined by said 180° bend.

4. The combination of the sealing ring defined in claim 3 with a pair of adjustable compression members which define a cavity in which high pressures are encountered and means for compressing said compression members.

5. The combination as defined in claim 4 wherein said compression members comprise a pair of flanges having forward, rearward and annular peripheral end surfaces, said flanges being disposed in forward face toward forward face relationship, said annular peripheral end surface intersecting said forward and rearward surfaces, said cavity being formed by grooves in the forward faces of said flanges, and said means for compressing said compression members comprising a V-band constrictor circumscribing said flanges and means on said constrictor for tightening it radially inwardly around the flanges.

6. A seal especially adapted for confining fluids at high temperatures and pressures, and comprising a sealing ring in the form of an integral piece of resilient sheet metal of approximately E-shape in radial cross section, the outer arms of the E having a sinuous configuration and including continuous raised portions at the outer and inner ends thereof which are outwardly convex and a continuous portion intermediate said raised portions which is outwardly concave, the central arm of the E having two elongated portions which extend in generally parallel, spaced, side-by-side relation and are interconnected at the inner end of said central arm by a 180° bend, said outer arms of the E being of essentially equal length and the portions of said outer arms which project inwardly beyond said inner end of the central arm being from 1.5 to 3.5 times as long as said central arm, said outer arms of the E diverging from the periphery of the ring outwardly when the ring is in its normal relaxed condition, said inner outwardly convex continuous raised portions at the inner ends of said outer arms presenting inwardly concave surfaces facing each other; said seal further including means to enhance the sealing of said raised portions at the inner ends of the outer arms, said means comprising a ring in the from of an integral piece of resilient sheet metal of approximately C-shape in radial cross section, said C-ring being coaxial with said seal ring and having a thickness equal to the distance between said inwardly concave surfaces and engaging said surface, the open portion of said C-ring facing generally inwardly, and vent means formed in said seal ring to place the region outwardly of said C-ring in fluid communication with the region inwardly of the C-ring.

7. The combination of the sealing ring defined in claim 6 with a pair of adjustable compression members which define a cavity in which high pressures are encountered and means for compressing said compression members.

8. The combination as defined in claim 7 wherein said compression members comprise a pair of flanges having forward, rearward and annular peripheral end surfaces, said flanges being disposed in forward face toward forward face relationship, said annular peripheral end surface intersecting said forward and rearward surfaces, said cavity being formed by grooves in the forward faces of said flanges, and said means for compressing said compression members comprising a V-band constrictor circumscribing said flanges and means on said constrictor for tightening it radially inwardly around the flange.

9. A seal especially adapted for confining fluids at high temperatures and pressures, and comprising a sealing ring in the form of an integral piece of resilient sheet metal of approximately E-shape in radial cross section, the outer arms of the E having a sinuous configuration and including continuous raised portions at the outer and inner ends thereof which are outwardly convex and a continuous portion intermediate said raised portions which is outwardly concave, the central arm of the E having two elongated portions which extend in generally parallel, spaced, side-by-side relation and are interconnected at the inner end of said central arm by a 180° bend, said outer arms of the E being of essentially equal length and the portions of said outer arms which project inwardly beyond said inner end of the central arm being from 1.5 to 3.5 times as long as said central arm, said outer arms of the E diverging from the periphery of the ring outwardly when the ring is in its normal relaxed condition, the inner ends of said outer arms being curved over and forming a 180° bend, each of said outer arms defining lip portions which are opposed to each other and are in engaging relationship, said lips of said end portions of said outer arms including repetitive portions which are displaced axially of the seal away from the plane of engagement of said lips, corresponding ones of said repetitive portions being mutually opposed to define openings between said lips via which the pressure fluid can enter the space between said outer arms to energize the seal.

10. The combination of the sealing ring defined in claim 9 with a pair of adjustable compression members which define a cavity in which high pressures are encountered and means for compressing said compression members.

11. The combination as defined in claim 10 wherein said compression members comprise a pair of flanges having forward, rearward and annular peripheral end surfaces, said flanges being disposed in forward face toward forward face relationship, said annular peripheral end surface intersecting said forward and rearward surfaces, said cavity being formed by grooves in the forward faces of said flanges, and said means for compressing said compression members comprising a V-band constrictor circumscribing said flanges and means on said constrictor for tightening it radially inwardly around the flanges.

12. In combination with a pair of adjustable compression members which define a cavity in which high pressures are encountered and means for compressing said compression members, a sealing ring in the form of an integral piece of resilient sheet metal of approximately E-shape in radial cross section, the outer arms of the E having a sinuous configuration and including continuous raised portions at the outer and inner ends thereof which are outwardly convex and a continuous portion intermediate said raised portions which is outwardly concave, the central arm of the E having two elongated portions which extend in generally parallel, spaced, side-by-side relation and are interconnected at the inner end of said central arm by a 180° bend, said outer arms of the E being of essentially equal length and the portions of said outer arms which project inwardly beyond said inner end of the central arm being from 1.5 to 3.5 times as long as said central arm, said outer arms of the E diverging from the periphery of the ring outwardly when the ring is in its normal relaxed condition.

13. The combination as defined in claim 12 wherein said compression members comprise a pair of flanges having forward, rearward and annular peripheral end surfaces, said flanges being disposed in forward face toward forward face relationship, said annular peripheral end surface intersecting said forward and rearward surfaces, said cavity being formed by grooves in the forward faces of said flanges, and said means for compressing said compression members comprising a V-band constrictor circumscribing said flanges and means on said constrictor for tightening it radially inwardly around the flanges.